UNITED STATES PATENT OFFICE 2,659,757

α-AROYL-β-TRICHLORMETHYL-ETHYLENES

Jean Druey, Riehen, Switzerland, assignor to Ciba Pharmaceutical Products, Inc., Summit, N. J.

No Drawing. Application April 2, 1951, Serial No. 218,890

Claims priority, application Switzerland April 20, 1950

1 Claim. (Cl. 260—592)

The present invention is concerned with valuable α-aroyl-β-trichloromethyl-ethylenes.

While a large number of compounds with bactericidal and fungicidal action are known, none can be said to be ideal, for each to some extent is tissue irritating. The embodiment of new compounds with enhanced bactericidal and fungicidal activity and with reduced or, at least, without increased irritation to tissue therefore represents a desideratum in the art.

A primary object of the present invention is the embodiment of new compounds of the character described. This is achieved by the α-aroyl-β-trichloromethyl-ethylenes of the present invention. These ethylene compounds correspond to the formula

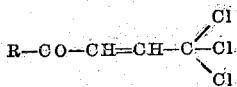

wherein R stands for an aryl radical containing at least one halogen atom. In addition to the halogen atom or atoms, the aryl nucleus may also carry a lower alkyl group, such as methyl, ethyl, propyl, butyl or the like.

These new compounds are characterized by their bacteriostatic and fungistatic activity; they are therefore useful as disinfecting agents and also therapeutically in the treatment of illnesses due to fungi. Particularly valuable in this regard are the α-(p-fluoro-benzoyl)-β-trichloromethyl-ethylene, α-(2-methyl-4-fluoro-benzoyl)-β-trichloromethyl-ethylene, a-(3,4-dichlorobenzoyl) - β - trichloromethyl - ethylene, α - (2,5 - dichlorobenzoyl)-β-trichloromethyl-ethylene and α - [4 - chloro - naphthoyl - (1)] - β - trichloromethyl-ethylene.

The aforedescribed aroyl-ethylenes are obtained by reacting an aroyl-methyl-ketone, the aryl nucleus of which carries at least one halogen atom, with trichloracetaldehyde and splitting off water simultaneously or subsequently.

The reaction with trichloracetaldehyde is preferably carried out in a diluent which, if desired, may be or may contain a condensing agent; preferably the reaction is carried out in the presence of glacial acetic acid and an acetate.

The invention is set forth in greater detail in the following examples of presently preferred illustrative embodiments thereof. Parts by weight bear the same relationship to parts by volume as does the gram to the cubic centimeter. Percentages are by weight. The temperatures are given in degrees centigrade.

Example 1

31 parts by weight of p-chloro-acetophenone and 30 parts by weight of anhydrous chloral are heated to boiling for 20 hours in 15 parts by volume of glacial acetic acid. After evaporating off the volatile components of the resulting reaction mixture in vacuo at 100°, α-(p-chlorobenzoyl) - β - hydroxy - β - trichloromethyl - ethane crystallizes out. It melts at 118–119°.

10 parts by weight of the thus-obtained α-(p-chloro - benzoyl) - β - hydroxy - β - trichloromethyl-ethane are dissolved in 100 parts by volume of concentrated sulfuric acid. After standing for two hours at 20°, the reaction solution is poured onto ice water. The separated solid product is isolated, washed with water, and recrystallized from ethyl alcohol of 90% strength. The thus-obtained α-(p-chloro-benzoyl)-β-trichloromethyl-ethylene of the formula

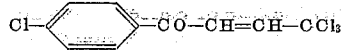

is pale yellow and melts at 115–116°.

Example 2

A mixture of 9.5 parts by weight of 3,4-dichloroacetophenone, 7.5 parts by weight of anhydrous chloral and 8 parts by volume of glacial acetic acid is heated to boiling for 40 hours. Thereupon, after evaporating the reaction mixture to dryness in vacuo on the water-bath, the residue is crystallized from a small quantity of carbon tetrachloride, the product thus obtained being α-(3,4-dichloro-benzoyl)-β-hydroxy-β-trichloromethyl-ethane in pure form, melting at 116–117°.

30 parts by weight of the thus-obtained α-(3,4-dichloro - benzoyl) - β - hydroxy - β - trichloromethyl-ethane are dissolved in 150 parts by volume of a mixture of equal parts of concentrated sulfuric acid and oleum (24%) and then allowed to stand for 6 hours at 20°. The reaction mixture is then poured onto ice, whereupon α - (3,4 - dichlorobenzoyl) - β - trichloromethyl-ethylene of the formula

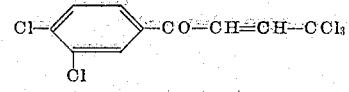

separates out as an oil which soon crystallizes. It is purified by recrystallization from ethyl alcohol and then melts at 66–67°. The yield is 22 parts by weight.

Example 3

A mixture of 19 parts by weight of 2,5-dichloroacetophenone, 15 parts by weight of anhydrous chloral and 16 parts by volume of glacial acetic acid is heated to boiling for 40 hours. After evaporating off the volatile components of the resulting reaction mixture in vacuo at 100°, α-(2,5-dichloro-benzoyl)-β-hydroxy-trichloromethylethane is obtained. After recrystallization from hexane, it melts at 101–102°.

16 parts by weight of the thus-obtained α-(2,5-dichloro-benzoyl)-β-hydroxy-trichloromethyl-ethane are allowed to stand for 3 days at 0° in 80 parts by volume of concentrated sulfuric acid. The reaction mixture is then poured onto ice, the separated oil extracted with ether, the ether removed from the ethereal solution, and the obtained residue subjected to distillation in high vacuo. The resultant α-(2,5-dichloro-benzoyl)-β-trichloromethyl-ethylene of the formula

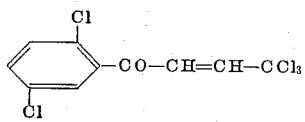

distils at 145–150° under 1 mm. pressure. It solidifies in crystalline form and, after recrystallization from petroleum ether, melts at 57–58°.

Example 4

A mixture of 59 parts by weight of p-fluoro-acetophenone, 64 parts by weight of anhydrous chloral and 30 parts by volume of glacial acetic acid is heated to boiling for 40 hours. After evaporating off the volatile components of the resulting reaction mixture in vacuo at 100°, α-(p-fluoro-benzoyl)-β-hydroxy-β-trichloromethyl-ethane, melting at 94–95°, is obtained.

30 parts of this α-(p-fluoro-benzoyl)-β-hydroxy-β-trichloromethyl-ethane are dissolved in 150 parts by volume of concentrated sulfuric acid and allowed to stand for 14 hours at 20°. The reaction solution is then poured into ice water, whereupon the α-(p-fluoro-benzoyl)-β-trichloromethyl-ethylene of the formula

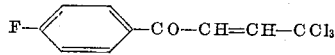

separates out. After recrystallization from hexane, this compound melts at 117–118°.

Example 5

A mixture of 38 parts by weight of 2-methyl-4-fluoro-acetophenone, prepared from m-fluoro-toluol and acetic anhydride in the presence of aluminum chloride, 38 parts by weight of anhydrous chloral and 20 parts by volume of glacial acetic acid is heated to boiling for 40 hours. Thereupon, after evaporating the reaction mixture to dryness in vacuo on the water-bath, the residue is crystallized from a small quantity of carbon tetrachloride. In this way, there is obtained α-(2-methyl-4-fluoro-benzoyl)-β-hydroxy-β-trichloromethylethane, melting at 103–105°.

30 parts by weight of the thus-obtained α-(2-methyl-4-fluoro-benzoyl)-β-hydroxy-β-trichloromethyl-ethane are admixed with 21 parts by weight of phosphorus pentoxide, and the mixture heated to 110° for 1 hour. After cooling, the reaction mixture is taken up in 100 parts by volume of ethyl alcohol and the resultant solution poured into water. The precipitated oily product is taken up in ether and, after evaporating off the solvent, is then subjected to distillation. The α-(2-methyl-4-fluoro-benzoyl)-β-trichloromethyl-ethylene of the formula

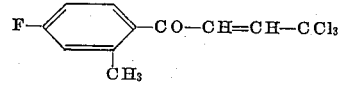

distils over at 120–122° under 0.05 mm. pressure as a weakly yellowish oil.

Example 6

25 parts by weight of the chloral addition product of 4-chloro-1-acetyl-naphthalene (melting point 92–93° upon recrystallization from hexane; obtained analogously to the other examples) are triturated with 25 parts by weight of phosphorus pentoxide and heated on the water-bath for two hours. After cooling, the mixture is dissolved in 150 parts by volume of hot ethyl alcohol, and water is gradually added until the reaction product begins to separate out. Upon cooling, the α-[4-chloro-naphthoyl-(1)]-β-trichloromethyl-ethylene of the formula

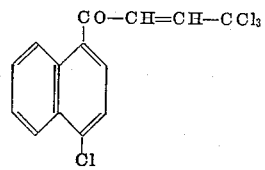

crystallizes out in pure form. It melts at 75–76°.

Example 7

40 parts by weight of para-bromacetophenone are heated to boiling for 20 hours with 30 parts by weight of anhydrous chloral and 20 parts by volume of glacial acetic acid. After the evaporation of the volatile parts in vacuo there remains the α-(para-bromobenzoyl)-β-hydroxy-β-trichloromethyl-ethane in the form of a crystalline mass. When recrystallized from carbon tetrachloride, it melts at 125°.

20 parts by weight of this compound are taken up in 100 parts by volume of concentrated sulfuric acid. After about 20 minutes dissolution is complete. The reaction solution is allowed to stand for 2 hours at 20° and then poured into ice water. The α-(para-bromobenzoyl)-β-trichloro-methyl-ethylene thus obtained has the formula

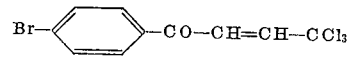

and, when recrystallized from ethyl alcohol, melts at 119–120°.

Example 8

21 parts by weight of para-iodoacetophenone are heated to boiling for 20 hours with 13 parts by weight of anhydrous chloral and 15 parts by volume of glacial acetic acid. After the evaporation of the volatile parts in vacuo there remains the α-(para-iodobenzoyl)-β-hydroxy-β-trichloro-methyl-ethane in the form of a crystalline mass. When recrystallized from carbon tetrachloride, it melts at 140°.

20 parts by weight of this compound are taken up in 100 parts by volume of concentrated sulfuric acid. After about 20 minutes dissolution is complete. The reaction solution is allowed to stand for 2 hours at 20° and then poured into ice water. The α-(para-iodobenzoyl)-β-trichloromethyl-ethylene thus obtained has the formula

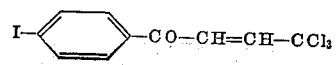

and, when recrystallized from ethyl alcohol, melts at 111–112°.

Having disclosed the invention, what is claimed is:

The compound α - (3,4 - dichloro - benzoyl) - β - trichloro - methyl - ethylene having bacteriostatic and fungistatic activity.

JEAN DRUEY.

References Cited in the file of this patent

UNITED STATES PATENTS

| Number | Name | Date |
|---|---|---|
| 2,532,558 | Kirby | Dec. 5, 1950 |

OTHER REFERENCES

Koenigs: Beruchte, vol. 25, pp. 792–802 (1892).

Mayer et al.: Berichte, vol. 60, pp. 2278–2283 (1927).

"Beilstein's Hanbuch der Organischen Chemie.," vol. 7, second supplement, page 299, published 1948 by Alien Property Custodian.